Figure 3:
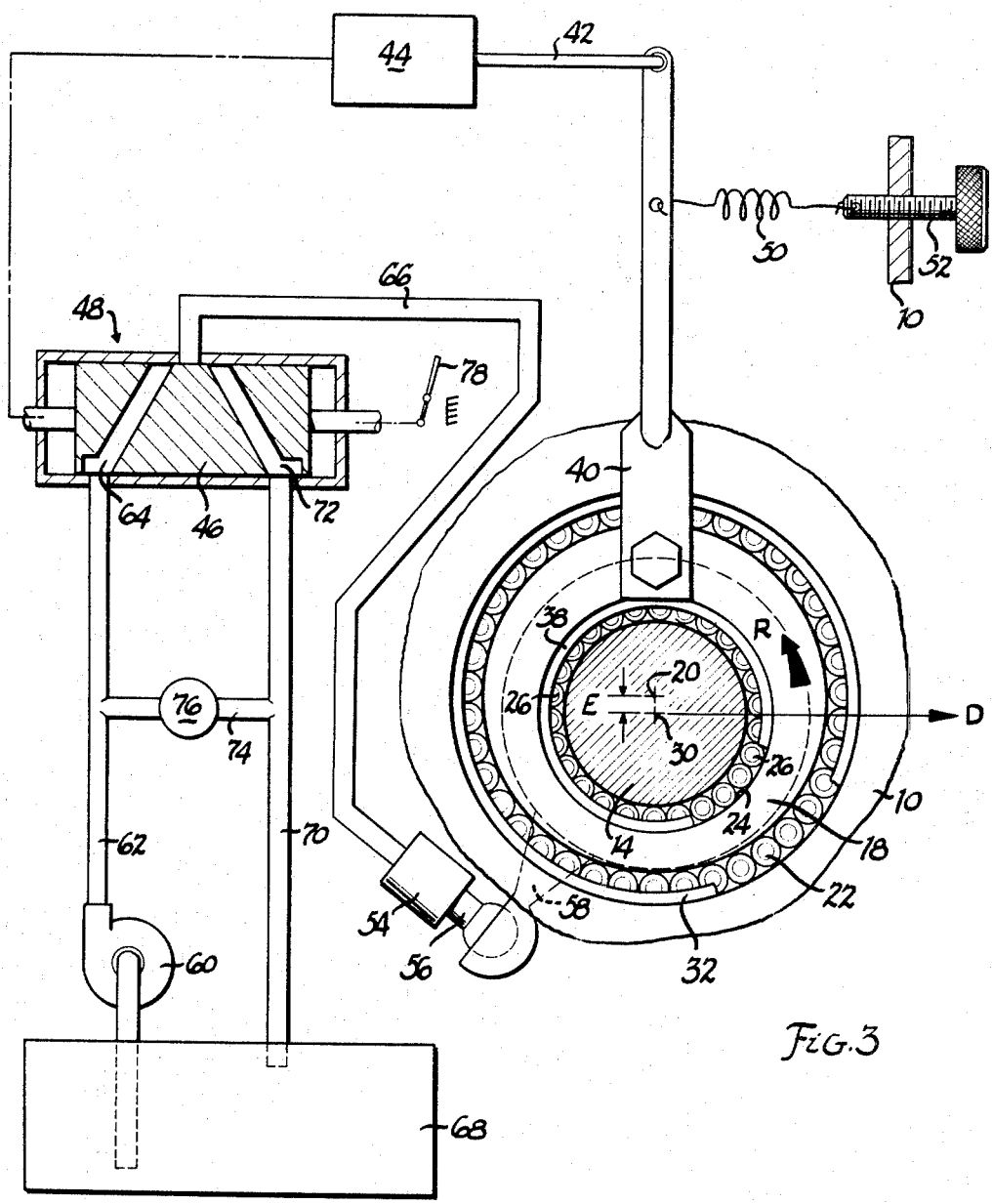

Dec. 10, 1968        M. C. BENNETT                3,415,325
             ECCENTRIC SENSING MECHANISM
Filed March 17, 1966                        2 Sheets-Sheet 1
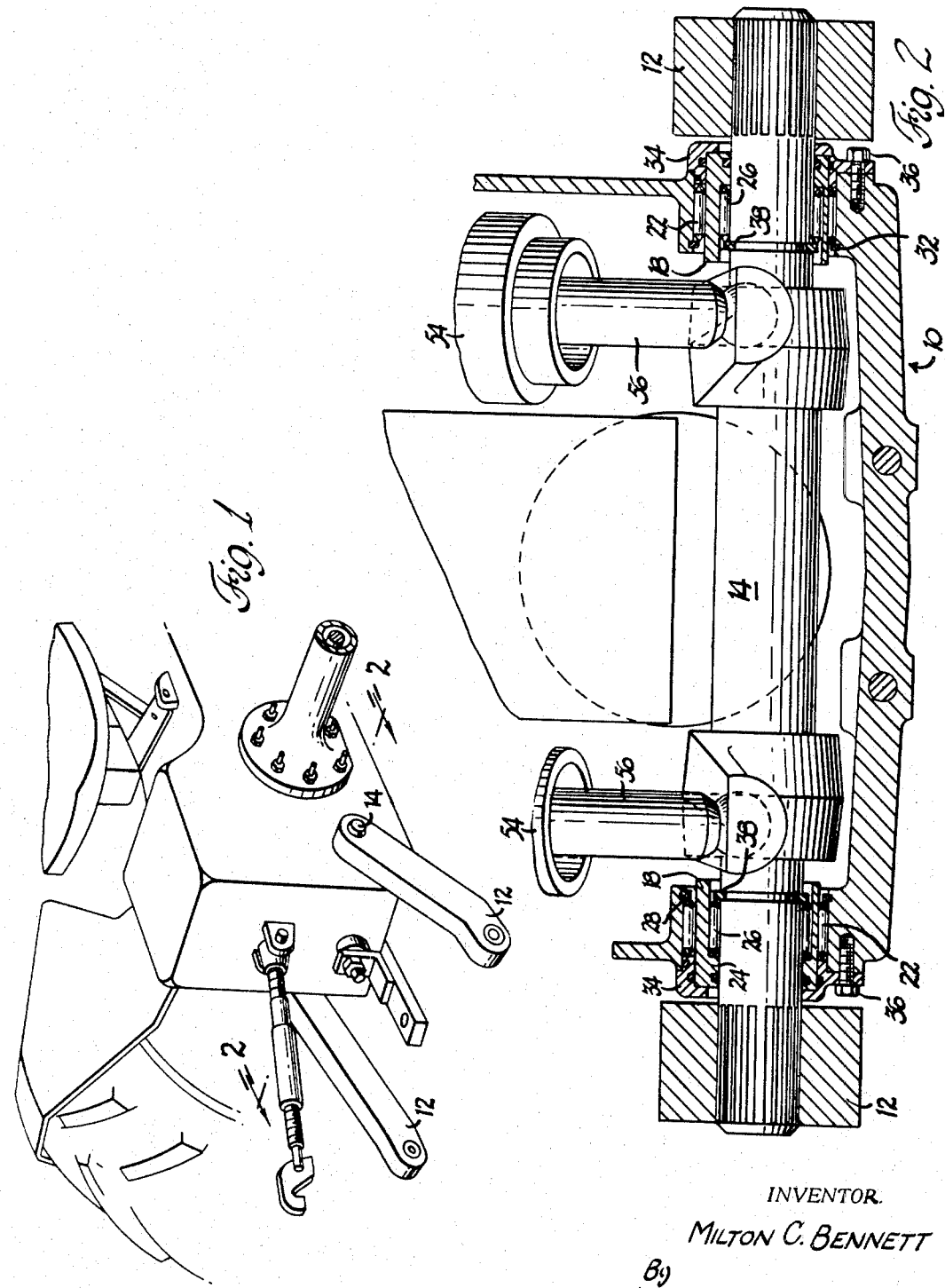
INVENTOR.
MILTON C. BENNETT
By
Wilson, Settle, Batchelder
ATT'YS. & Craig United States Patent Office 3,415,325
Patented Dec. 10, 1968

3,415,325
ECCENTRIC SENSING MECHANISM
Milton C. Bennett, Racine, Wis., assignor to J. I. Case Company, Racine, Wis., a corporation of Wisconsin
Filed Mar. 17, 1966, Ser. No. 535,218
6 Claims. (Cl. 172—7)

This invention relates to draft control systems employed to maintain a substantially constant draft on tractor-drawn earth-working implements by raising or lowering the implements in response to increasing or decreasing variations in draft, and more particularly to an improved form of draft sensing mechanism.

In most presently available draft control systems, an earth-working implement is coupled to the tractor by a hitch which will usually include draft arms connected at their forward ends to a rock shaft mounted for rotation in the tractor frame. In one system, a hydraulic motor acts against a crank mounted upon the rock shaft to rotate the rock shaft about its axis, thus raising or lowering the draft arms and the implement attached to the draft arms. In another system a second rock shaft is power driven and connected through appropriate linkage to the draft arms, the first rock shaft serving merely as a pivotal support for the draft arms. The additional basic elements of the usual draft control system are a hydraulic circuit, including a valve operable to conduct fluid under pressure to or from the rock shaft driving motor and a draft sensing mechanism which shifts the valve in response to an increase or decrease of the draft loading from a selected draft loading.

It is one object of the invention to provide an improved draft sensing mechanism for use in draft control systems of the types described above in which the sensing mechanism consists of a relatively small number of rugged parts.

It is another object of the invention to provide a draft sensing mechanism of the foregoing type of simple, efficient construction in which the draft elements themselves are employed to sense variations in implement draft.

The foregoing and other objects, are achieved in a draft control system in which a pair of draft arms are coupled at their rearward ends to the implement and are coupled to each other at their forward ends by a rock shaft which extends horizontally through the tractor frame. The rock shaft is journalled for rotation about its axis in an eccentric bearing assembly which in turn is rotatable within the tractor frame about a second axis parallel to, but offset from the rock shaft axis. Rotation of the rock shaft about the second axis is caused by variations in draft on the implement above or below the selected draft, and this rotation is employed as the draft signal to actuate the draft control system which applies the correcting action to raise or lower the implement.

Other objects and features of the invention will become apparent by reference to the following specification and to the drawings.

*In the drawings*

FIGURE 1 is a partial perspective view, with certain parts broken away, omitted, or shown in section of the rear end of a tractor showing certain elements of one form of draft system embodying the invention;

FIGURE 2 is a detail cross sectional view taken approximately on the line 2—2 of FIGURE 1 showing details of the rock shaft mounting; and FIGURE 3 is a cross sectional view taken on a vertical plane passing through rock shaft 14 between the frame and the right draft arm 12 combined with a schematic diagram of one form of hydraulic draft control system.

Referring first to FIGURE 1, the rear end of a tractor frame designated generally 10 is shown, together with a pair of rearwardly projecting draft arms 12 to which an implement is coupled in the conventional manner. At their forward ends, draft arms 12 are non-rotatably mounted upon a rock shaft 14 which extends transversely of the tractor frame 10 in a horizontal direction and perpendicular to the fore and aft axis of the tractor.

In accordance with the present invention, rock shaft 14 is mounted in the tractor frame in a manner such that the shaft can be shifted relative to the frame in proportionate response to the magnitude of draft load applied to an implement coupled to draft arms 12.

Rotatable bearing members 18 are rotatably journalled in each side of the tractor frame 10 for rotation about a common axis which extends horizontally of the tractor frame in perpendicular relationship to the fore and aft axis of the tractor. The axis of rotation of bearing members 18 is indicated at 20 in FIGURE 3. Bearing members 18 are supported for free rotation within the tractor frame as by needle bearings 22.

Rock shaft 14 is in turn rotatably supported within the bearing members 18 in eccentric relationship to the bearing axis as best seen in FIGURE 3. Bearing members 18 are each formed with an eccentric bore 24 and rock shaft 14 is in turn supported for free rotation within the bores about its own axis 30 as by a second set of needle bearings 26.

Needle bearings 22 are axially held in position in the tractor frame by an assembly which, as best seen in FIGURE 2, may include a snap ring 32 at the inner side of each bearing assembly and a cap 34 detachably mounted upon the tractor frame as by bolts 36 to retain bearing member 18 against outward axial displacement relative to the tractor frame. A second snap ring 38 is seated upon a groove in shaft 14 to retain the inner set of needle bearings 22 in position, as shown.

From the foregoing description, it is believed apparent that shaft 14 is supported for rotation relative to tractor frame 10 about the axis 20 which is, in turn, offset or eccentrically disposed with respect to the axis 30 of shaft 14 by distance E. The draft load is transmitted to shaft 14 by draft arms 12 and is applied to the shaft in a direction substantially perpendicular to the axis of the shaft, as indicated by arrow D. Raising and lowering of an implement attached to draft arms 12 is accomplished in the particular draft system shown in the drawings by rotating rock shaft 14 about its axis 30.

Assuming the assembly to be in a neutral position in which rock shaft axis 30 is vertically below bearing axis 20 during the application of a normal draft load, an increase in draft load is applied to shaft 14 as a force acting in the direction of the arrow D. The draft load is applied to the axis 30 of shaft 14 which is offset from axis 20 of bearing 18 by the eccentricity E indicated in FIGURE 3. The application of the draft force D to shaft 14 thus tends to swing shaft 14 in a counterclockwise direction about the central pivot defined by the axis 20 of bearing 18.

In one sense, this force may be considered to be transmitted to bearing 18 in a squeezing action in the region of the arrow R. Since the inner and outer peripheries of bearing member 18 are divergent upwardly on the side of member 18 to which the draft force is applied in compression, the squeezing action exerted on this portion of bearing member 18 urges the bearing member to rotate in the counterclockwise direction indicated by the arrow R of FIGURE 3.

This rotation of bearing member 18 is transmitted through a crank arm 40 and link 42 and a suitable mechanical proportioning or sensitivity adjustment mechanism schematically illustrated at 44 to the spool 46 of a hydraulic control valve 48. A tension spring 50 is coupled between crank 40 and an adjustment screw 52 mounted in the fixed frame 10 to provide an adjustable selected resistance to the rotation of bearing member 18 in response to increases in draft loads above a selected setting.

Valve 48 is schematically indicated in FIGURE 3 and is employed to control the flow of hydraulic fluid to and from lift cylinders such as are schematically illustrated at 54, the piston rods 56 of the lift cylinders in turn being connected to cranks 58 rigidly mounted upon rock shaft 14. The hydraulic system includes a pump 60 whose output conduit 62 may be connected to cylinder 54 when one passage 64 in the valve pool is in operative alignment with output conduit 62 and cylinder supply line 66. The hydraulic sump 68 is fed by a return line 70 which can be connected to cylinder supply line 66 via spool passage 72 when the valve spool is moved to the left from the position shown in FIGURE 3. A cross passage 74 with a relief valve 76 is connected between conduit 62 and 70 to enable the pump pressure to be bypassed across the valve when the valve is in its neutral or blocking position shown in FIGURE 3. A hand lever assembly 78 may be coupled to the valve spool to permit manual raising and lowering of the implement.

To summarize operation of the device, an implement is attached in the conventional manner to draft arms 12 and the sensitivity setting mechanism 44 may be adjusted to regulate the normal draft load exerted on the implement when the sensing mechanism is in the neutral position shown in FIGURE 3 in which axis 30 is located vertically below axis 20. Upon an increase in draft load above that originally selected, the increased draft acts to swing axis 30 in a counterclockwise direction about axis 20 as viewed in FIGURE 3 and this swinging action in turn forces bearing member 18 to rotate in a counterclockwise direction as indicated by the arrow R as explained above. This action in turn causes crank 40 and link 42 to transmit a signal through sensitivity mechanism 44 to valve spool 46 to move the valve spool to the right from the position shown in FIGURE 3.

When passage 64 moves into alignment with lift cylinder supply line 66, pressure is supplied to cylinder 54 from hydraulic pump 60 which in turn extends piston rod 56 of the lift cylinder to drive crank 58, and hence shaft 14 in a counter-clockwise direction as viewed in FIGURE 3, thereby elevating the implement. As the implement is elevated, the draft load exerted on the implement thereby decreases, permitting bearings 18 to rotate back toward their original position under the influence of spring 50 or other suitable mechanism in sensitivity adjustment mechanism 44, this action tending to restore valve spool 46 to its normal position.

The response of the system to a decrease in draft is substantially the same as described above except the directions of rotation of the various elements are reversed, as is the movement of valve spool 46.

The particular system shown in the drawings is known as a powered lower rock shaft system. The invention, however, is not limited to use in this particular system, but may equally well be used in other systems, as for example those shown in U.S. Patents Nos. 3,056,458 or 3,098,528.

While one embodiment of the invention has been described in detail, it will be apparent to those skilled in the art that the described embodiment may be modified. Therefore, the foregoing description is to be considered exemplary rather than limiting, and the true scope of the invention is that defined in the following claims.

I claim:

1. In a tractor implement hitch assembly having a rock shaft mounted in the tractor frame for rotation about a first axis normal to the fore and aft axis of the tractor, implement draft arms coupled to said rock shaft for transmitting draft from the tractor to an implement drawn thereby, power means actuable to rotate said rock shaft to raise or lower the implement, and draft control means including a draft sensing mechanism for controlling actuation of said power means in response to draft variations to raise or lower said implement to maintain a generally constant predetermined draft upon the implement; the improvement wherein said draft sensing mechanism comprises means supporting said rock shaft on the tractor frame for rotation about a second axis located in spaced parallel relationship to said first axis in proportionate response to variations in draft applied to said implement, and means responsive to rotation of said rock shaft about said second axis for controlling actuation of said power means.

2. In a hitch assembly as defined in claim 1; the further improvement wherein said means supporting said rock shaft comprises bearing means mounted in said tractor frame for rotation about said second axis, and means supporting said rock shaft within said bearing means for rotation therein about said first axis.

3. In a hitch assembly as defined in claim 2; the further improvement wherein said means responsive to rotation of said rockshaft about said second axis comprises an arm mounted upon said bearing means, and means coupled between said arm and said frame for establishing a normal position of rotation of said rockshaft about said second axis when a preselected normal draft load is applied to said implement.

4. In a hitch assembly as defined in claim 2; the further improvement wherein said bearing means comprises a circular bearing having an eccentrically located bore therein, and means supporting said rockshaft for free coaxial rotation in said bore.

5. In a draft control system for a tractor drawn implement; a pair of rotatable bearing members mounted for rotation about a common stationary axis extending transversely of a tractor frame, a shaft rotatably mounted in said bearing members for rotation about a second axis located in parallel eccentric relationship to the axis of rotation of said bearing members, means coupling said shaft in draft transmitting relationship to an implement with the draft load applied to said implement being transmitted to said shaft by said coupling means in a direction normal to the axis of said shaft, and means responsive to rotation of said bearing members about said stationary axis for driving said shaft in proportionate rotation about said second axis.

6. For use in a draft control system for a tractor drawn implement having a pair of draft arms, means coupling said draft arms at one end to the implement, and means coupling the other end of said draft arms to the tractor frame; a draft sensing mechanism for generating a signal representative of the draft on the implement wherein said means coupling the other ends of said draft arms to said tractor frame comprises rockshaft means fixedly secured to said other ends of said arms with the axis of said shaft means extending in a direction normal to the fore and aft axis of the tractor, and means on said tractor frame supporting said rockshaft means for rotation about a second axis parallel to and offset from the axis of said rockshaft means in proportionate response to variations in draft loading applied to said draft arms.

References Cited

FOREIGN PATENTS 519,394  3/1940  Great Britain.

ABRAHAM G. STONE, *Primary Examiner.*

J. R. OAKS, *Assistant Examiner.*